United States Patent [19]
Rossi

[11] 4,219,838
[45] Aug. 26, 1980

[54] HORIZONTAL BLANKING CORRECTOR FOR TELEVISION SIGNALS

[75] Inventor: John P. Rossi, Stamford, Conn.

[73] Assignee: CBS Inc., New York, N.Y.

[21] Appl. No.: 18,000

[22] Filed: Mar. 7, 1979

[51] Int. Cl.² .............................................. H04N 9/12
[52] U.S. Cl. ..................................... 358/21 R; 358/33
[58] Field of Search ....................... 358/11, 21, 31, 33, 358/35

Primary Examiner—Robert L. Richardson
Attorney, Agent, or Firm—Spencer E. Olson

[57] ABSTRACT

The disclosed system for correcting excessive horizontal blanking of color television signals, separates the luminance and chrominance components of the television signal, separately expands or stretches the luminance and chrominance components, corrects the error in the color subcarrier caused by expansion of the chrominance component, and combines the expanded luminance and chrominance components. The system may be implemented in either the analog domain or the digital domain, the latter being preferred because the circuits are less critical and the quality of performance is substantially constant.

18 Claims, 9 Drawing Figures

HORIZONTAL BLANKING CORRECTOR FOR TELEVISION SIGNALS

BACKGROUND OF THE INVENTION

Regulations of the United States Federal Communications Commission (FCC) specify that the maximum horizontal blanking width permitted to be broadcasted is 11.44 microseconds at that level of the radiated signal corresponding to 90 IRE units. Television plant signal processing techniques often result in horizontal blanking widths considerably in excess of this, and additional blanking errors are sometimes introduced by misadjustments and equipment malfunctions. It has been found that some video signals exceed the FCC horizontal blanking requirements by as much as two microseconds.

Production houses are often to blame for supplying video taped material with incorrect blanking. Whatever the reasons, most television stations are saddled with programs that do not meet the blanking specifications of the FCC. Although stricter quality control can prevent excessive blanking in future productions, there remains a need to correct excessive blanking on older material and in those cases where normal studio processing or undetected equipment failure results in excessive blanking. Since the FCC appears to be taking a posture of stricter enforcement of its horizontal blanking specifications, there is a need for a horizontal blanking width corrector for NTSC color television signals.

Since the excessive horizontal blanking normally introduced by plant operations is usually of the order of a few hundred nanoseconds, it can be corrected by stretching the active video out into the blanked picture area. This process introduces some excess picture width, but it is not objectionably noticeable; under worst case conditions where two microseconds of excessive blanking is corrected, 4% horizontal non-linearity will be introduced. This makes the aspect ratio of the picture greater than the specified 4 to 3, but it should be subjectively acceptable provided it is not compared side-by-side with an unstretched picture. The process of expansion can be readily performed by changing the scanning time base. For example, a digital time base corrector samples and stores video into a memory at a sampling frequency $F_s$ and then reads the video out of memory at a different rate $(F_s - \Delta)$. More specifically, to expand an NTSC color television picture, one could sample the signal at four times the color subcarrier rate $(4F_{sc})$, write the signal into a memory, and then read it out of memory at a $(4F_{sc} - \Delta)$ rate. The resultant picture will undergo a $(\Delta/4 - F_{sc}) \times 100\%$ horizontal expansion. This type of expansion, however, shifts all signal frequencies by $(\Delta/4 - F_{sc}) \times 100\%$, resulting in an incorrect color subcarrier.

The primary object of the present invention is to provide a blanking width corrector system wherein picture width is expanded while maintaining the integrity of the color subcarrier frequency.

SUMMARY OF THE INVENTION

Briefly, the blanking width corrector according to the invention consists of three basic subsystems: a comb filter for separating the luminance and chrominance components of the color television signal, a pair of elastic memories for separately but simultaneously stretching the luminance and chrominance signals, a circuit for correcting the color subcarrier in the stretched chrominance signal, and means for recombining the stretched luminance signal and the stretched and corrected chrominance signal.

The system may be implemented in either the analog domain or the digital domain, or partially analog and partially digital. An all digital approach is preferred, however, because the circuits are less critical and the quality of the performance substantially constant.

BRIEF DESCRIPTION OF THE DRAWINGS

Other objects, features and advantages of the invention will become apparent, and its construction and operation better understood, from the following detailed description, taken in conjunction with the accompanying drawings, in which.

DESCRIPTION OF THE PREFERRED EMBODIMENT

Figure 1:
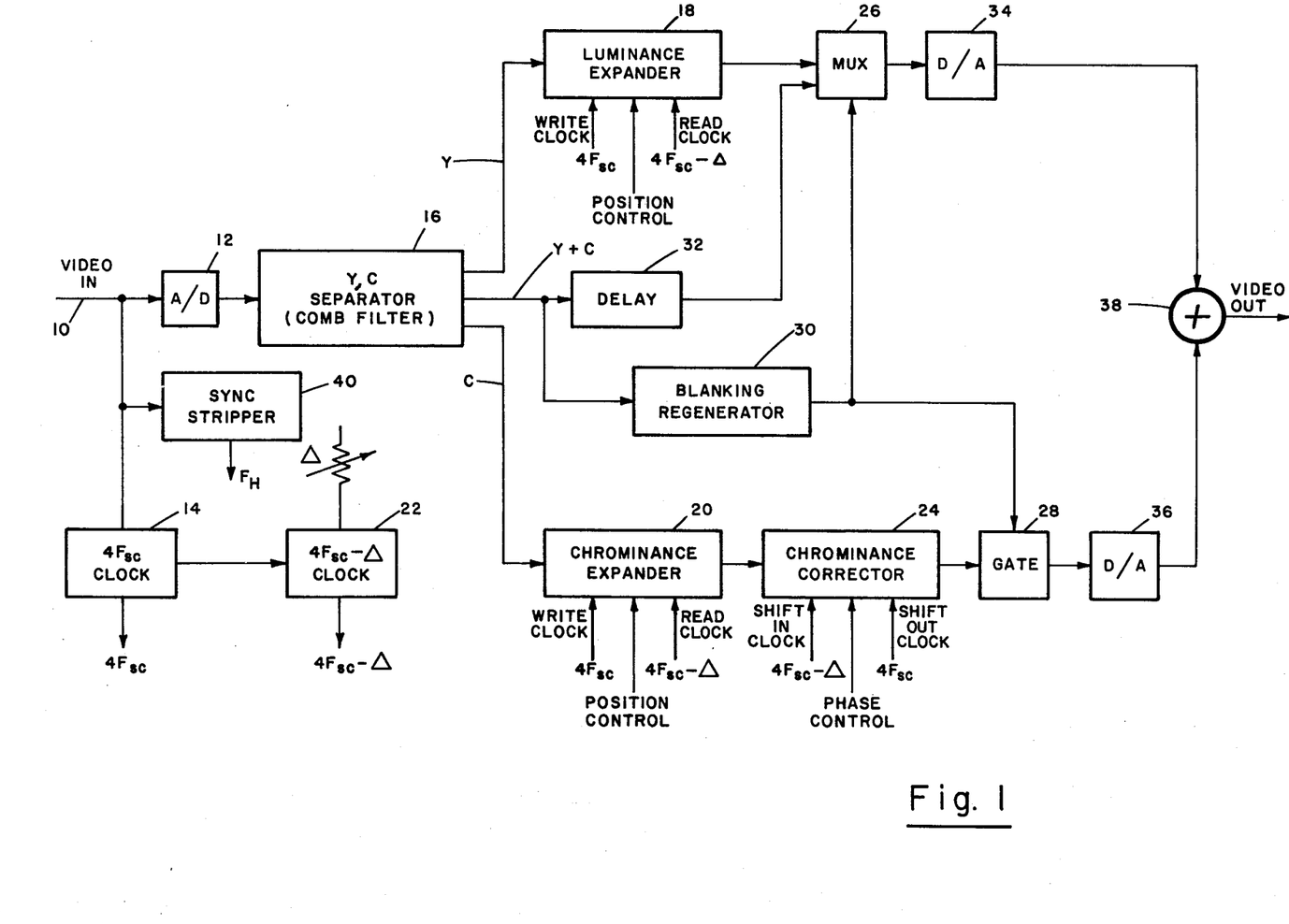
FIG. 1 is a block diagram of a horizontal blanking corrector according to the invention.

FIG. 1 shows in block diagram form the basic elements of the horizontal blanking corrector according to the present invention, as applied to the NTSC system of television. A digital implementation is shown, but with relatively minor modifications the block diagram would also be representative of an analog implementation. An input video signal in analog form received on input line 10 is coupled to the input of an analog-to-digital converter 12, and also to a clock generator 14. The A/D converter 12, of conventional design, converts the input video to a PCM-encoded signal, preferably at a sampling rate of $4F_{sc}$, where $F_{sc}$ is the color subcarrier frequency. A comb filter 16 of known design separates the luminance and chrominance components of the PCM-encoded signal; the encoded luminance (Y) and encoded chrominance (C) are respectively applied to a luminance expander 18 and to a chrominance expander 20. The expanders 18 and 20, which may take the form of random access memories (RAM) operating as elastic memories having a write clock frequency of $4F_{sc}$ and a read clock frequency of $(4F_{sc} - \Delta)$, separately but simultaneously stretch the luminance and chrominance components of the applied signal. A position control signal is also applied to each of the expanders 18 and 20 to re-position the active picture to the left or to the right of a re-timed sync reference, normally the station sync.

Figure 8:
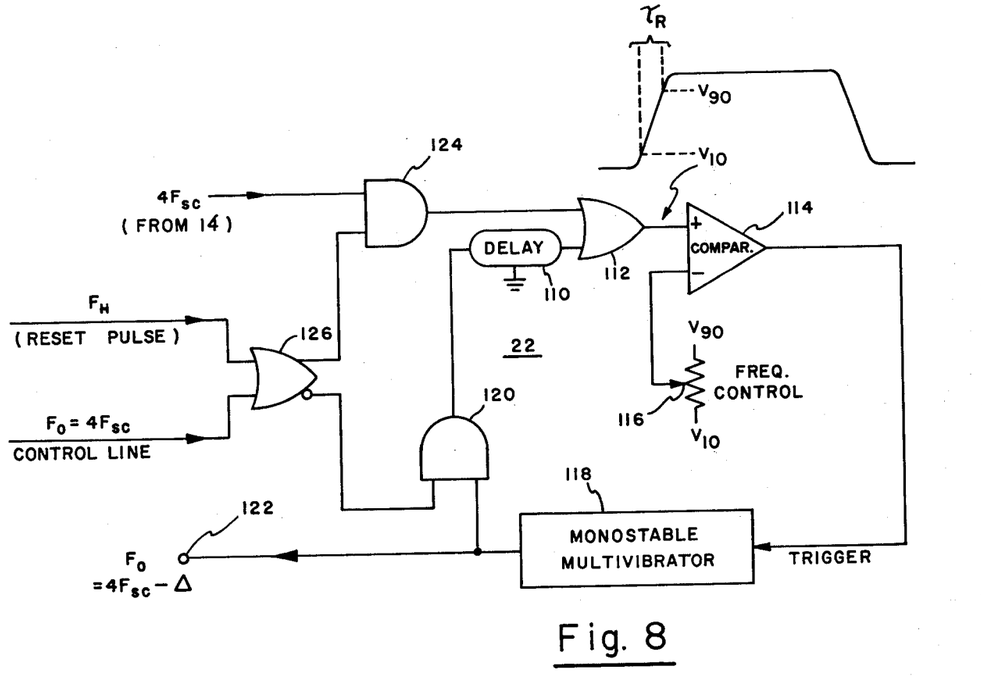
FIG. 8 is a block diagram of a variable clock generator useful in the system of FIG. 1.

The write clock signal is produced by clock generator 14, which includes a color subcarrier regenerator of conventional design for regenerating the color subcarrier which, in the NTSC television system is 3.58 MHz. The regenerated color subcarrier signal controls generator 14 to produce a train of clock pulses having a frequency of $4F_{sc}$. The $(4F_{sc}-\Delta)$ clock signal is produced by a clock generator schematically shown at 22, a particular implementation of which is shown in FIG. 8 and will be described hereinbelow.

To correct the error in the color subcarrier caused by stretching of the chrominance signal, the stretched chrominance signal is additionally processed by a chrominance corrector 24, which is essentially a digital demodulator and re-modulator which converts the chrominance color subcarrier frequency from $(F_{sc}-\Delta/4)$ to $F_{sc}$. The expanded chrominance signal is shifted into chrominance corrector 24 at the $(4F_{sc}-\Delta)$ rate determined by clock 22 and the re-constructed chrominance signal is shifted out at the $4F_{sc}$ rate determined by clock 14. Since changes in video positioning in the expanders 18 and 20 has the effect of causing a phase shift in the color subcarrier of the chrominance signal, it is necessary to correctly phase the color subcarrier to a reference color burst. The reference color burst cannot be abruptly changed as a function of video positioning because this would result in a temporary loss of color lock in a television receiver. Therefore, the phase of the color subcarrier must be adjusted so as to cancel any phase shift introduced by the repositioning process. This adjustment is accomplished in the demodulator/remodulator of chrominance corrector 24 in response to a "Phase Control" signal applied to the corrector; the process will be described in detail below in connection with FIGS. 3, 4, 5, 6 and 7.

To enable subsequent recombination of the expanded luminance and chrominance signals it is necessary to re-insert in the luminance signal properly synchronized sync and color burst signals. This is accomplished by coupling the expanded luminance and chrominance signals through respective multiplexer 26 and gate 28 each controlled by a standard blanking signal produced by a blanking regenerator 30 of known construction connected to receive the unseparated Y+C signal. The Y+C signal is also applied through a delay circuit 32 as a second input to gate 26; delay circuit 32 introduces a delay corresponding to that nominally introduced by luminance expander 18.

Figure 1A:
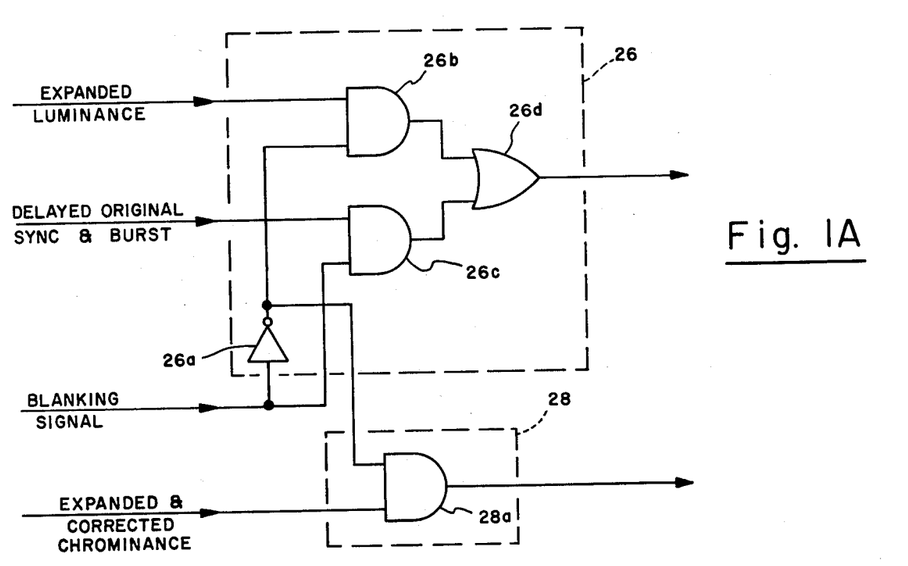
FIG. 1A is a logic diagram of a preferred implementation of the gate and multiplexer in the system of FIG. 1.

The multiplexer 26 and gate 28 may be implemented as shown in FIG. 1A; gate 28 is simply an AND gate 28a connected to receive as one input the expanded and corrected chrominance signal, and to receive as a second input the regenerated blanking signal after inversion by an inverter 26a. Multiplexer 26 comprises two AND gates 26b and 26c, an OR gate 26d and the aforementioned inverter 26a. The expanded luminance signal is applied as one input to AND gate 26b, the other input being the inverted blanking signal from inverter 26a. The delayed Y+C signal containing the original sync and burst is applied as one input to gate 26c and the blanking signal is applied as the second input. Thus, during the blanking interval, the inverted blanking signal turns off the expanded luminance signal and turns on the properly synchronized burst and sync. At the same time, the inverted blanking signal turns gate 28a off to preclude any chrominance signal going through during the blanking interval. At the conclusion of the blanking interval, the sync and burst are turned off and the expanded luminance and chrominance signals are coupled through their respective gates.

It will be noted that at the output of multiplexer 26 the expanded luminance signal has a sampling rate of $4F_{sc}-\Delta$, whereas the expanded chrominance signal, following correction, has a sampling rate of $4F_{sc}$, a condition which prevents direct combination of the two signals. Although the sampling rate of one could be changed to the sampling rate of the other, this can introduce troublesome problems. It has been found much easier, and accordingly it is preferred, to convert the expanded signals to analog signals and combine the analog signals. To this end, the expanded luminance and chrominance signals are applied to digital-to-analog converters 34 and 36, respectively, and the resulting analog signals are recombined in an adder 38 to produce an analog video output signal which is expanded in the horizontal direction by an amount proportional to $\Delta$.

A sync stripper 40 of conventional design connected to input line 10 produces horizontal drive pulses at a frequency $F_H$ in synchronism with the horizontal pulse of successive television lines; the purpose of the H-drive pulses will be evident as the description proceeds.

Figure 2:
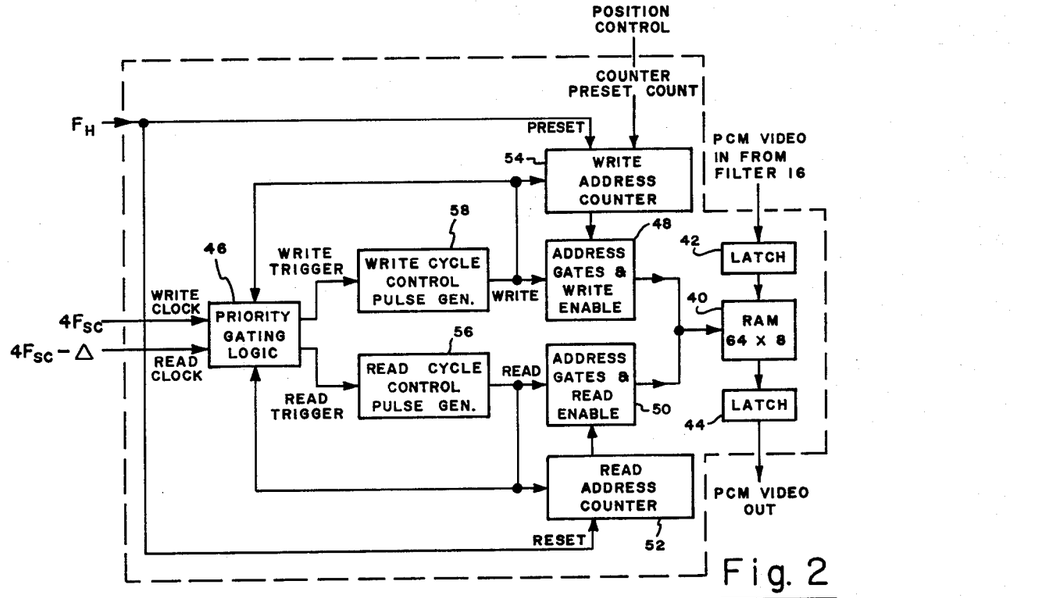
FIG. 2 is a block diagram showing the organization of the expanders used in the system of FIG. 1.

In a system which has been successfully operated, each of the luminance and chrominance expanders 18 and 20 is a high-speed emitter coupled logic (ECL) RAM with a total capacity of 64×8 bits, capable of being written and read at two different addresses in less than one video sampling period. In FIG. 2, which is a block diagram representative of both of expanders 18 and 20, the memory 40 is organized as a 64×8 array into which PCM video from comb filter 16 is written via a latch 42 and from which (in the case of expander 18) a PCM video signal representing the expanded luminance signal is read out via a latch 44. The writing into and reading out of the memory is controlled by circuitry similar to that employed in a digital time base corrector; namely, to sample and store video into the memory at one sampling frequency and to read the video out of memory at a different rate. The write and read cycles are controlled by the $4F_{sc}$ and $(4F_{sc}-\Delta)$ clocks, respectively, but since they must not overlap, a priority gating logic 46 is provided to determine whether a read or a write operation should be performed, and to initiate either a read or a write cycle, provided the previous read or write cycle has been completed. If a write cycle is initiated, address gates and write enable circuit 48 is activated, and if a read cycle is initiated address gates and read enable circuit 50 is activated.

At the start of each television line a read address counter 52 is reset to zero by an H-drive pulse from sync stripper 40 (FIG. 1) and a write address counter 54 is preset by the H-drive pulse to a count determined by the amount of delay required between the input PCM video signal from filter 16 and the retimed sync and burst from delay 32; that is, the amount of video re-positioning with respect to sync required. Hence, positioning of the video with respect to a reference sync is accomplished by applying a preset control signal to write address counter 54. The control signal consists of a binary coded 4- or 5-bit signal, each quantizing level of which corresponds to a 70 nanosecond $(1/4\ F_{sc})$ time shift. The counters 52 and 54 may be 6-bit binary counters. The read address counter 52 is advanced by pulses from a read cycle control pulse generator 56 at the $(4F_{sc}-\Delta)$ rate, while the write address counter 54 is clocked at a frequency of $4F_{sc}$ by pulses produced by a write cycle control pulse generator 58. Thus, when $\Delta$ is greater than zero, the output from RAM 40 will increasingly lag the input as the RAM fills up, thereby resulting in picture expansion.

Because the RAM 40 has a total capacity of 64×8 bits, it can provide a total time base expansion of 4.48 microseconds per television line; i.e., 64 samples times 70 nanoseconds per sample. Since the system need provide a maximum of only two microseconds of expansion, the additional available storage is used for picture positioning; that is, to reposition the active picture to the left or to the right of a re-timed sync reference which, as has been indicated, is achieved by presetting the write address counter 54 with respect to the read address counter 52 at the start of each television line. It is emphasized that the system (i.e., expanders 18 and 20 and their associated circuitry) is reset and preset at the start of each television line for the amount of stretching required and for proper picture positioning for the required amount of expansion. The same $4F_{sc}$ and $(4F_{sc}-\Delta)$ clocks are used for controlling the write and read cycles of both of expanders 18 and 20. In practice, a common circuit with the read-write control logic and read-write address counters is used to control memory 40 in both the luminance and chrominance expanders 18 and 20; consequently the luminance and chrominance signals from the respective expanders track exactly during the expansion process.

Figures 3, 4:
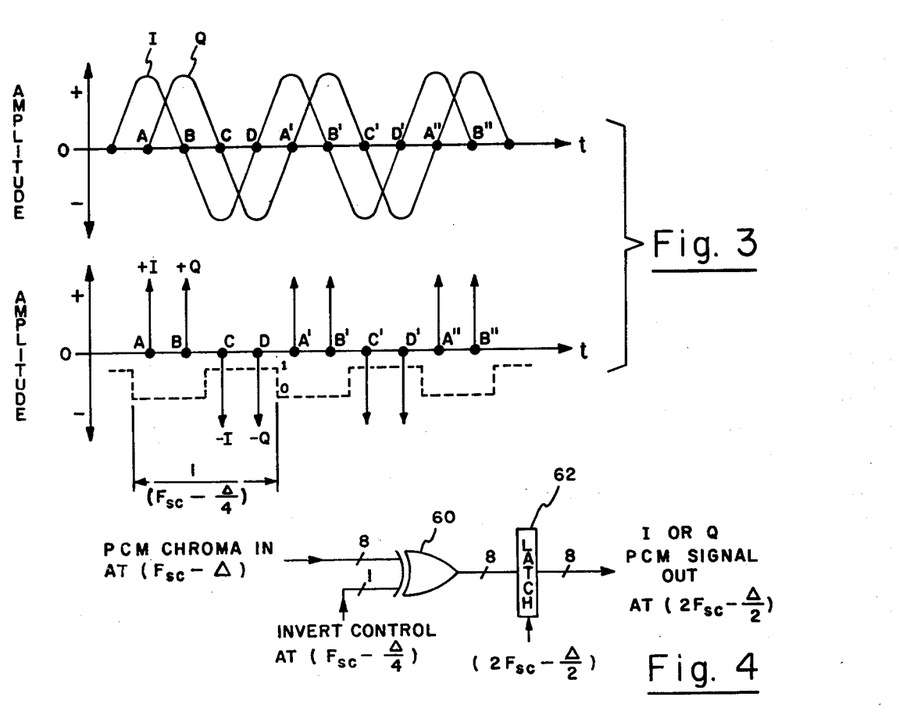
FIG. 3 is a pair of diagrams useful in explaining the operation of the chrominance corrector used in the system of FIG. 1.
FIG. 4 is a simplified logic diagram of a system for demodulating encoded chrominance signals into its I and Q components.

As has been noted, horizontal expansion of the PCM-encoded chrominance signal causes an error in the color subcarrier frequency which must be corrected in order for the expanded signal to be correctly displayed. Correction of the color subcarrier frequency is accomplished by digitally demodulating the expanded chrominance signal into two quadrature components using $(4F_{sc}-\Delta)$ as the carrier reference, and then re-modulating the quadrature components into the chrominance signal using $4F_{sc}$ as the carrier reference. How this is accomplished will now be described with reference to FIGS. 3, 4 and 5. The original chrominance signal from comb filter 16, which consists of two quadrature components (I and Q, or R-Y and B-Y, or any other undefined quadrature components) is received at the input of chrominance expander 20 at a sampling rate of $4F_{sc}$; that is, there are four samples per cycle of the color subcarrier. Since the samples are equally spaced they have a 90° phase separation with respect to the color subcarrier. Therefore, each sample represents the peak value of a quadrature component and the zero value of the other. Labelling the two quadrature components I and Q, this is illustrated in FIG. 3A, wherein at sample point "A" the I component is of maximum amplitude in the positive direction whereas the value of the Q component is zero. At sample point "B" the amplitude of the Q component is maximum in the positive direction and the I component has zero amplitude. At sample point "C" the I component has a maximum negative value, whereas the Q component is zero, and at sample point "D" the I component goes to zero and the Q component goes to its maximum negative value. Without defining the phase of the encoding clock with respect to the color subcarrier, the digital samples at the above-described sample points can represent any two arbitrary quadrature components. The digital samples are depicted in FIG. 3B from which it is seen that alternate samples represent the quadrature components I and Q with the value of each alternating between positive and negative values. At the output of the chrominance expander the sampling rate is $4F_{sc}-\Delta$ but the relationship of the samples with respect to the original color subcarrier is not changed by the described expansion process. The chrominance signal is demodulated by selecting alternate code words for each quadrature signal and inverting every other code word selected.

A basic circuit for accomplishing the described demodulation, shown in FIG. 4, consists of an exclusive OR gate 60 to one input of which the PCM-encoded chrominance signal is applied. As indicated, the chrominance signal is 8-bit encoded at a sampling rate of $(4F_{sc}-\Delta)$, the rate at which the chrominance signal is read out of chrominance expander 20. A control signal having a frequency of $[F_{sc}-(\Delta/4)]$ is applied as a second input to the gate 60. When the control signal (depicted in dotted line in FIG. 3B) is a digital "1", the exclusive OR inverts the incoming signals at the other input, and when the control signal is a digital "0" the other input is transmitted without inversion. Thus, at the output of gate 60 the I and Q components have only positive values representing, in effect, the baseband I and Q signals. To separate the I and Q components, the output from gate 60 is applied to a latch circuit 62 which is clocked at a $[2F_{sc}-(\Delta/2)]$ rate. Depending on the phasing of the control signal with respect to the encoded signal applied to the latch, one or the other of the PCM-encoded I and Q signals appears at the output of the latch circuit at a sampling rate of $[2F_{sc}-(\Delta/2)]$. As will be seen from the discussion to follow, a complete demodulator includes two circuits of the type shown in FIG. 4, one for obtaining the I component and the other for obtaining the Q component, with each delivering its respective quadrature signal at twice the color subcarrier rate minus $\Delta/2$.

Figure 5:
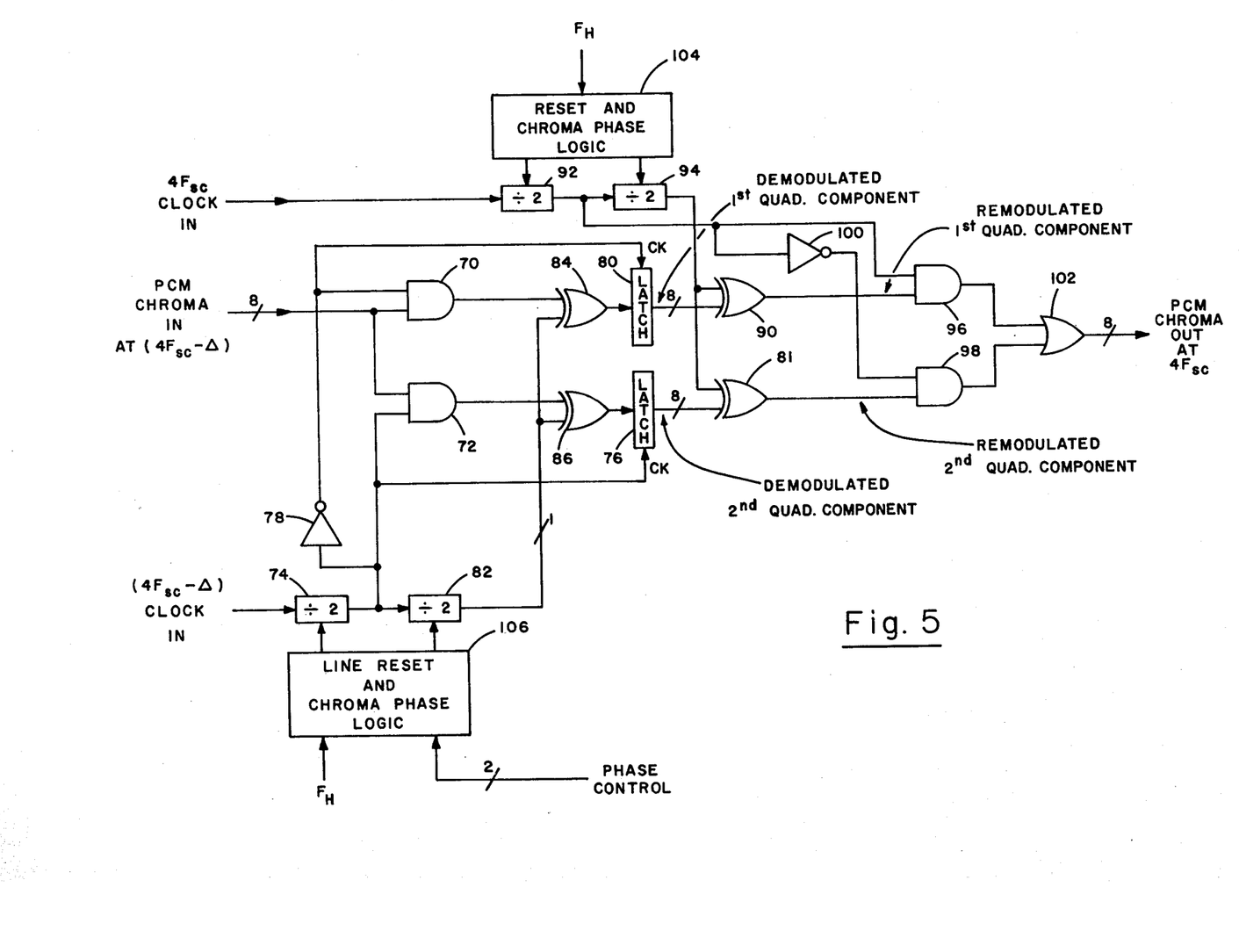
FIG. 5 is a logic diagram of a preferred implementation of the chrominance corrector utilized in the system of FIG. 1.

FIG. 5 is a logic diagram of the complete demodulator/remodulator used in the chrominance corrector of a video expander system that has been successfully operated. The PCM-encoded chroma at a sample rate of $(4F_{sc}-\Delta)$ is applied as one input to each of two AND gates 70 and 72; a second input to AND gate 72 is a clock signal of one-half the frequency of $(4F_{sc}-\Delta)$ obtained by dividing the $(4F_{sc}-\Delta)$ clock in a divide-by-two circuit 74. The output signal from divider 74 is applied to the clock terminal of a latch 76 and is also inverted by an inverter 78 and applied as a second input to AND gate 70, and also to the clock terminal of a latch circuit 80. The signal at the output of divider 74 is further divided by two in a divider circuit 82 to produce an invert control signal of frequency $[F_{sc}-(\Delta/4]$ for a pair of exclusive OR circuits 84 and 86. It will be recognized that exclusive OR circuit 84 and its associated latch, and exclusive OR 86 and its associated latch, each correspond to the circuit illustrated in FIG. 4. The AND gates 70 and 72, under control of a signal of half the frequency of the $(4F_{sc}-\Delta)$ clock, apply the input chroma first to one then to the other of exclusive OR gates 84 and 86 so that the output of one of the latches, say latch 80, is the demodulated first quadrature component, with the demodulated other quadrature component appearing at the output of latch 76. It matters not what designation (i.e., I or Q, R-Y or B-Y, or any two quadrature components) is given to the first and second quadrature components. It will be recognized from the previous discussion that the output of each of latches 76 and 80 is a series of code-words, with the output of one latch arbitrarily representing the baseband of one quadrature component and the output of the other latch representing the baseband of the other quadrature component.

As has been noted earlier, re-modulation of the two quadrature components is achieved by simply inverting each quadrature component at the $2F_{sc}$ rate to obtain a signal having the format illustrated in FIG. 3B. This is accomplished by applying the output signals from latches 76 and 80 to respective exclusive OR gates 88 and 90 each of which is controlled by an invert control signal having a frequency $F_{sc}$. The invert control signal is obtained by twice dividing by two the $4F_{sc}$ clock in divide-by-two circuits 92 and 94. Thus, the output of gate 90 is the remodulated first quadrature component and the output of gate 88 is the remodulated second quadrature component. These signals are applied as one input to respective AND gates 96 and 98; a signal at $2F_{sc}$ obtained at the output of divide-by-two circuit 92 is applied as a second input to gate 96 and this signal is inverted by an inverter 100 and applied as the second input to gate 98. The outputs of AND gates 96 and 98, which alternately deliver the remodulated first quadrature component and the second quadrature component, each at a $2F_{sc}$ sampling rate, are applied to an OR gate 102 which combines the two quadrature components to produce a PCM-encoded chrominance output signal at a word rate of $4F_{sc}$.

As has been mentioned earlier, it is necessary to adjust the phase of the chrominance color subcarrier in order to cancel any phase shift introduced by the repositioning of the video with respect to a reference sync. This is achieved in the demodulator/remodulator system of FIG. 5. As has been described, the demodulator produces at the outputs of latch circuits 80 and 76 two baseband quadrature color signals, which may be arbitrarily designated I and Q or Q and I, respectively, and, as has just been described, the remodulator provides a $4F_{sc}$ PCM-encoded word stream representing the chrominance signal. Referred to the original sync, this word stream is of the form I, Q, $-$I, $-$Q; I, Q $-$I, $-$Q, etc.; that is, for $1/4F_{sc}$ period the chrominance signal has the amplitude of the I quadrature component, the next $1/4F_{sc}$ period the chrominance signal is the Q quadrature component, the next $1/4F_{sc}$ period the chrominance is the negative I quadrature component, the next $1/4F_{sc}$ period the chrominance is the negative Q quadrature component; then it starts again with I, Q, etc. Thus, the chrominance color subcarrier phase can be changed in 90° steps by changing the starting order of the remodulated chrominance word stream: that is, for a 90° phase shift, the remodulated color signal, referred to the original sync, would be Q, $-$I, $-$Q, I; Q, $-$I, $-$Q, I; etc.,; for 180° phase shift it would be $-$I, $-$Q, I, Q; $-$I, $-$Q, I, Q; etc. for 270° it would be, $-$Q, I, Q, $-$I; $-$Q, I, Q, $-$I; etc.; and for 360° phase shift it would be the original sequence.

The pulse code modulated chroma at the output of AND gate 102 is properly phased by the combined action of a reset and chroma phase logic circuit 104 and a line reset and chroma phase logic circuit 106, which will presently be described in detail with reference to FIGS. 7 and 6, respectively. Generally speaking, logic circuit 104 under control of line reset pulses, $F_H$, delivers a reset pulse to divide-by-two circuit 92 and a preset or reset pulse to divide-by-two circuit 94. Similarly, logic circuit 106, in response to the line reset pulses, $F_H$, and a phase control signal, provides a preset or reset pulse to divide-by-two circuit 74 and a preset or reset pulse to divide-by-two circuit 82.

Figure 6:
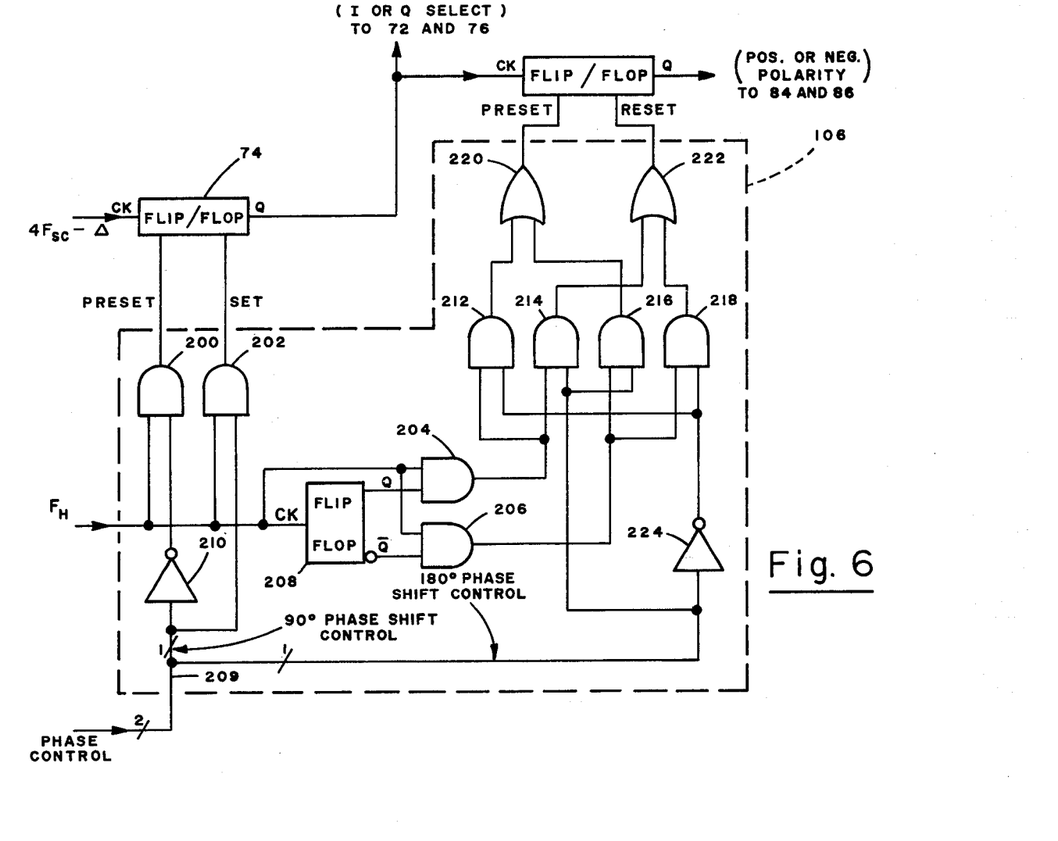
FIG. 6 is a diagram illustrating the logic of the line reset and chrominance phase control subsystem of the system of FIG. 5.

Referring to FIG. 6, the line reset and chrominance phase control logic 106, contained within the dotted line enclosure, is connected to flip/flops 74 and 82 each of which functions as a divide-by-two circuit and thus the functional equivalent of the similarly labelled blocks in FIG. 5. As has been noted previously, the subcarrier phase of the final output chrominance signal must vary in response to repositioning of the video with respect to reference sync. At the beginning of each television line, a line reset pulse $F_H$ of very short duration, derived from sync stripper 40, is applied as one input to each of four AND gates 200, 202, 204 and 206, and also to the "clock" input of a flip/flop circuit 208. A phase control signal, which is tied to the two least significant bits of the position control address line (FIG. 2), is applied over line 209 as a second input to AND gate 202 and also to the input of an inverter 210, the output of which is applied as a second input to AND gate 200. Although line 209 is shown in the drawing as a single line, the phase control input actually consists of two independent logic lines, with the least significant bit of the position control address used to provide either zero or 90° phase shift, and with the second least significant bit of the position control address line used to provide either zero or 180° phase shift. Hence, at the start of each television line, depending on whether the least significant bit of the phase control signal is at logic "high" or logic "low", the $F_H$ reset pulse will be gated through AND gates 202 or 200, respectively, either resetting flip/flop 74 to logic "0" or presetting flip/flop 74 to logic "1", respectively. It will be recalled that the output of flip/flop 74 determines which of two quadrature components of the chroma signal is fed to latch 76 or latch 80. A change from one quadrature component to the other is equivalent to a 90° phase shift.

The short duration $F_H$ reset pulse is also gated through AND gate 204 and on alternate television lines through AND gate 206, depending on the state of flip/flop 208. The complementary logic outputs of flip/flop 208, Q and $\overline{Q}$, are respectively applied as a second input to AND gate 204 and as a second input to AND gate 206. The line reset pulse $F_H$ appearing at the output of one or the other of AND gates 204 or 206 is then steered to the preset or the reset input of divide-by-two flip/flop 82 via AND gate 212 and an OR gate 220, or AND gate 216 and OR gate 220, or AND gate 214 and an OR gate 222 or AND gate 218 and OR gate 222, under control of the second least significant bit of the phase control signal. The second least significant bit is applied as a second input to each of AND gates 214 and 216, and also to the input of an inverter 224, the output of which is applied as a second input to each of AND gates 212 and 218. The outputs of AND gates 214 and 218 are applied as first and second inputs to OR gate 222, the output of which is applied to the "reset" input of flip/flop 82, and the outputs of AND gates 212 and 216 are applied as inputs to OR gate 220, the output of which is applied to the "preset" input of flip/flop 82. Whenever the output of OR gate 220 is a logic "1" its output Q is set to logic "1", and whenever the output of OR gate 22 is at logic "1" the output Q of the flip/flop is reset to logic "0". The output of flip/flop 82 is applied to exclusive OR gates 84 and 86 (FIG. 5), which it will be recalled, perform a polarity inversion of the output of flip/flop 82, thus effectively introducing a 180° phase change.

Figure 7:
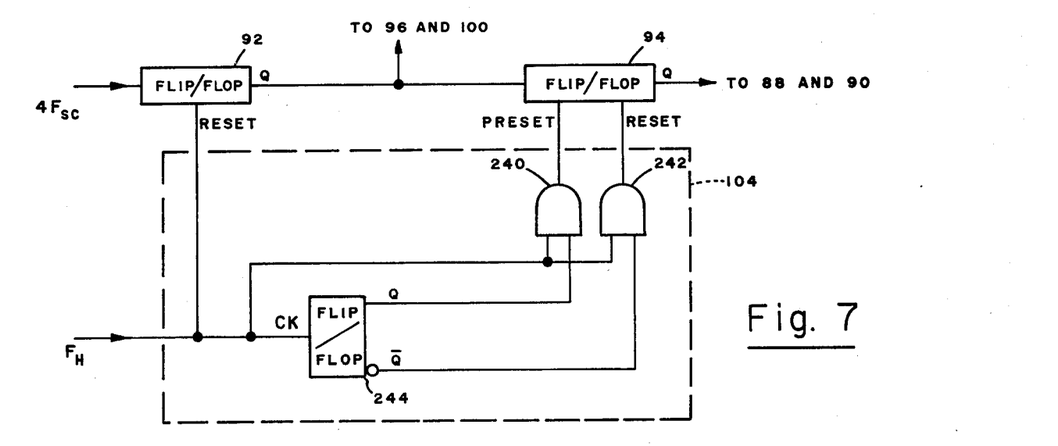
FIG. 7 is a diagram illustrating the logic of the reset and chrominance phase control subsystem of the system of FIG. 5.

Referring now to FIG. 7, the line reset and chroma phase reset logic circuit 104 consists simply of a pair of AND gates 240 and 242 the outputs of which are respectively applied to the "preset" and "reset" inputs of the divide-by-two flip/flop 94, and a flip/flop 224 the Q output of which is applied to one input of AND gate 240 and the complementary output $\bar{Q}$ of which is applied as one input to AND gate 242. At the beginning of each television line, a short duration line reset pulse $F_H$, derived from sync stripper 40, is applied as a second input to each of AND gates 240 and 242, and is also used as the "clock" input to flip/flop 244; the $F_H$ pulse is also applied to the "reset" input of divide-by-two flip/flop 92. The output Q of flip/flop 92 is reset to logic "0" when $F_H$ is at logic "1". It will be evident that with the described connections when the Q output from flip/flop 244 is at logic "1", the line reset pulse $F_H$ coupled through gate 240 presets flip/flop 94 to a logic "1"; similarly, when the $\bar{Q}$ output from flip/flop 244 is at logic "1", the line reset pulse $F_H$ coupled through AND gate 242 resets flip/flop 94 to a logic "0". Because of the action of flip/flop 244, flip/flop 94 will be preset to logic "1" every other television line, and it will be reset to logic "0" on alternate television lines. The output of flip/flop 94 is applied to exclusive OR gates 88 and 90 (FIG. 5) and determines the polarity of the chrominance signal going through these gates. Thus, at the start of each television line, the chrominance signal is inverted, that is, it has a 180° phase difference from line-to-line, as required in the NTSC color television system.

From the foregoing description it will be evident that the operation of the present video expander is dependent on a variable clock generator providing a frequency ($4F_{sc}-\Delta$). A major requirement of the clock generator is that it be capable of having its frequency and phase reset almost instantaneously at the start of each television line. It need have only short term frequency stability since it is expected to operate as a voltage controlled oscillator (VCO) in a closed loop. Its frequency range, $\Delta$, must be from zero to approximately $4\% \times 4F_{sc}$, in order to correct blanking errors up to a maximum of two microseconds. The oscillator shown in FIG. 8 meets these requirements. In essence the clock generator 22 comprises a closed loop including a delay device 110 the output of which is applied as one input of an OR gate 112 the output of which, in turn, is applied to the positive terminal of a comparator 114. A control voltage $V_c$, the amplitude of which is controllable by a potentiometer 116, is applied to the negative terminal of the comparator. The output terminal of the comparator is connected to the trigger element of a monostable multivibrator 118, the output of which is applied as one input to an AND gate 120 and also to the output terminal 122 of the oscillator. The oscillator requires a trigger to start; the $4F_{sc}$ clock signal from clock generator 14 applied as one input to an AND gate 124 provides the trigger to the second input of OR gate 112 and the reference phase at the start of each line when the $F_H$ reset pulse is received from sync stripper 40. The $F_H$ pulse is received from sync stripper 40. The $F_H$ pulse, a very narrow reset pulse, is applied through OR gate 126 to the other input of AND gate 124. The output frequency $F_0$ is expressed in terms of the loop delay ($\tau=1/F_0$), which is determined by the propagation delay through the gates, the comparator, the multivibrator, and the delay line 110, as well as by the trigger level of comparator 114 defined by the control voltage $V_c$. The frequency range $\Delta$ is given by the inverse of the comparator input pulse rise time ($1/\tau_r$) since the control voltage $V_c$ is restricted to values within the 10% to 90% point of the comparator input pulse. When the comparator input pulse exceeds the control voltage $V_c$, the comparator produces a positive transition at its output which triggers the monostable multivibrator; the multivibrator, in turn, controls the width of the positive-going excursion of the output clock signal $F_0$. The output clock signal has a duty cycle of approximately 50%, with the start of the positive pulses being controlled by the time of occurrence of the positive transition at the output of comparator 114. If no video expansion is required, a positive control signal applied to the reset gate 126 disables AND gate 120 thereby opening the loop and forcing the output frequency $F_0$ to be precisely $4F_{sc}$.

The described system has produced satisfactory results in that the resulting expanded pictures are subjectively acceptable to the viewer. That is, there are no serious picture impairments, such as visible beats, as might have been expected from the expansion, particularly the chrominance correction process. It will be appreciated by ones skilled in the art that it is essential to remove all chrominance from the luminance prior to expansion because otherwise residual chrominance in the luminance undergoes a frequency shift during stretching and shows up in the picture as a rainbow smear at vertical color transitions. This can be accomplished with a suitable digital comb filter with adaptive features for chroma deletion, or in appropriate circumstances an analog comb filter with a sharp notch filter in the luminance channel to remove residual chrominance can be used. It should be noted, however, that the notch filter will also affect the frequency response of the luminance signal and desirably is avoided.

Another factor to be considered in the implementation of the described system is chrominance-luminance registration. Because of the signal sampling rate change in the chrominance subcarrier corrector, up to ±35 nanoseconds of color registration error is introduced. This is unnoticeable so long as the error remains constant, but as the amount of expansion is changed, the luminance will expand smoothly, whereas the chrominance will expand in 70 ns jumps, and misregistration becomes noticeable.

Although a particular preferred embodiment of the invention has been disclosed in detail above for illustrative purposes, it will be understood that variations or modifications of such disclosure, which come within the scope of the appended claims, are fully contemplated. For example, although in the described system the luminance and chrominance components are separated from each other before they are expanded, it is possible (although more difficult) to expand the composite signal first, and then separate the stretched composite signal into its luminance and chrominance components, correct the color subcarrier of the expanded chrominance component, and recombine the expanded luminance signal with the corrected expanded chrominance signal. Further, although in the described system the incoming analog video is converted to digital form before separation into its Y and C components, a commercially available analog comb filter may be used to separate the luminance and chrominance components, which are then converted to PCM-encoded signals by means of a pair of A/D converters.

What is claimed is:

1. Apparatus for correcting for excessive horizontal blanking of color television signals, said apparatus comprising:

means for expanding by the same amount the luminance and chrominance components of an input television signal;

means for re-positioning the expanded luminance component and the expanded chrominance component with respect to a reference sync and burst;

means for correcting the error in the color subcarrier of the expanded chrominance component caused by expansion and/or repositioning; and means for recombining the re-positioned expanded luminance and corrected chrominance components to produce a horizontally expanded composite color television signal.

2. Apparatus according to claim 1, wherein said apparatus further comprises means for separating the input television signal into its luminance and chrominance components before expansion thereof.

3. Apparatus according to claim 1 or claim 2, wherein said apparatus further includes means responsive to the input television signal for generating reference sync and burst signals, and wherein said correcting means comprises means for correcting the phase of the color subcarrier of the expanded chrominance component relative to the phase of said reference burst signal.

4. Apparatus according to claim 2, wherein said apparatus further comprises means for pulse code modulating the luminance and chrominance components of said input television signal.

5. Apparatus according to claim 4, wherein said pulse code modulating means comprises analog-to-digital converter means arranged to convert the input television signal to coded form before separation into its luminance and chrominance components.

6. Apparatus according to claim 4 or claim 5, wherein said recombining means includes means for converting the re-positioned expanded luminance and chrominance components to analog form, and means for summing the expanded analog luminance and chrominance components.

7. Apparatus according to claim 4, wherein said expanding means comprises separate expanders for the luminance and chrominance components, each of which comprises an elastic memory having a write clock frequency higher than its read clock frequency, and wherein both memories have like write and like read clock frequencies.

8. Apparatus according to claim 7, wherein said pulse code modulating means has a sampling frequency four times the frequency of the color subcarrier ($4F_{sc}$) of the input television signal, and wherein the write and read clock frequencies of both said expanders respectively are $4F_{sc}$ and ($4F_{sc} - \Delta$), where $\Delta$ is proportional to the required correction of excessive horizontal blanking.

9. Apparatus according to claim 8, wherein said color subcarrier correcting means comprises:

means for digitally demodulating the expanded chrominance signal into two quadrature components using a frequency of ($4F_{sc} - \Delta$) as the carrier reference, and means for digitally re-modulating the said quadrature components, using a frequency of $4F_{sc}$ as the carrier reference, to provide a corrected expanded chrominance signal.

10. Apparatus according to claim 9, wherein said color subcarrier corrector means further comprises means responsive to said re-positioning means for altering the phase of the color subcarrier of the expanded chrominance signal relative to the phase of said reference burst signal.

11. Apparatus for correcting for excessive horizontal blanking of color television signals, said apparatus comprising:

means for separating an input color television signal into its luminance and chrominance components;

means for expanding by the same amount the said separated luminance and chrominance components;

means for re-positioning the said expanded luminance and chrominance components with respect to a reference sync and burst signal;

means for correcting the phase of the color subcarrier of the expanded chrominance component relative to the phase of said reference burst signal; and means for recombining the re-positioned expanded luminance and chrominance components to produce a horizontally expanded composite color television signal.

12. Apparatus according to claim 11, wherein said apparatus further comprises analog-to-digital converter means for pulse code modulating the luminance and chrominance components of the input color television signal.

13. Apparatus according to claim 11, wherein said apparatus further comprises analog-to-digital converter means for receiving and pulse code modulating the input color television signal before separation into its luminance and chrominance components.

14. Apparatus according to claim 13, wherein said expanding means comprises separate expanders for the said separated luminance and chrominance components, each of which expanders comprises elastic memory means having a write clock frequency higher than its read clock frequency.

15. Apparatus according to claim 14, wherein said analog-to-digital converter means has a sampling frequency four times the frequency of the color subcarrier ($4F_{sc}$) of the input color television signal, and wherein the write and read frequencies of both said expanders respectively are $4F_{sc}$ and ($4F_{sc} - \Delta$), where $\Delta$ is proportional to the required blanking correction.

16. Apparatus according to claim 15, wherein said color subcarrier correcting means comprises:

means for digitally demodulating the expanded chrominance signal, using a frequency of ($4F_{sc} - \Delta$) as the carrier reference, into two quadrature components, and means for digitally re-modulating the said two quadrature components, using a frequency of $4F_{sc}$ as the carrier reference, to produce a corrected expanded chrominance signal.

17. Apparatus according to claim 16, wherein said color subcarrier corrector means further comprises:

means responsive to said re-positioning means for altering the phase of the color subcarrier of the expanded chrominance signal with respect to the phase of said reference burst signal.

18. Apparatus according to claim 16 or claim 17, wherein said recombining means comprises:

digital-to-analog converter means for separately converting the luminance component and the expanded chrominance component to analog form, and means for summing the expanded analog luminance and chrominance components.

* * * * *